United States Patent [19]

Adams

[11] 4,284,248
[45] Aug. 18, 1981

[54] PACKING PULVERIZER

[76] Inventor: Harold R. Adams, Rte. 1, St. Francisville, Ill. 62460

[21] Appl. No.: 23,847

[22] Filed: Mar. 26, 1979

[51] Int. Cl.³ .............................................. B02C 19/00
[52] U.S. Cl. .............................. 241/278 R; 241/169.1
[58] Field of Search ............... 241/98, 168, 169, 169.1, 241/277, 278 R, 283; 51/241 S, 241 VS, 245; 277/1, 9, 9.5; 408/67, 68, 203, 203.5, 204, 230; 425/376 R

[56] References Cited

U.S. PATENT DOCUMENTS

| 277,966 | 5/1883 | Whiteside | 408/204 |
| 531,546 | 12/1894 | Matthews | 277/9 X |
| 1,484,352 | 2/1924 | Izard | 408/204 |
| 2,400,160 | 5/1946 | Mizell | 51/241 VS |
| 2,700,995 | 2/1955 | Ritter | 241/92 X |
| 3,122,969 | 3/1964 | Shames et al. | 241/169.1 X |
| 3,634,981 | 1/1972 | Connor | 51/241 S |
| 3,923,259 | 12/1975 | Gorsha | 241/278 R |

Primary Examiner—Mark Rosenbaum
Attorney, Agent, or Firm—Glenn K. Robbins

[57] ABSTRACT

A packing pulverizer device for removing packing from cup-shaped packing glands having a valve stem passing therethrough. The pulverizer device is particularly adapted for use in valve stems confined inside yokes where the ends are difficult to obtain access. The device is comprised of a semi-cylindrical housing which can be opened and clamped loosely about the valve stem. The device has comminuting means at the bottom adapted to grind up and comminute old packing within the cup-shaped gland. Spiral flute means are provided on the exterior to remove the comminuted material. The device is provided with a handle for manual rotation and grinding and also a gear train means which can be employed for connection to a prime moving source.

6 Claims, 5 Drawing Figures

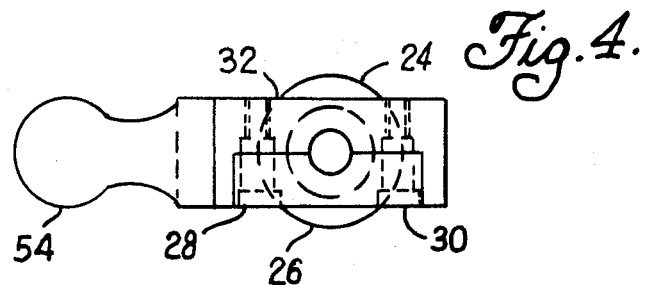
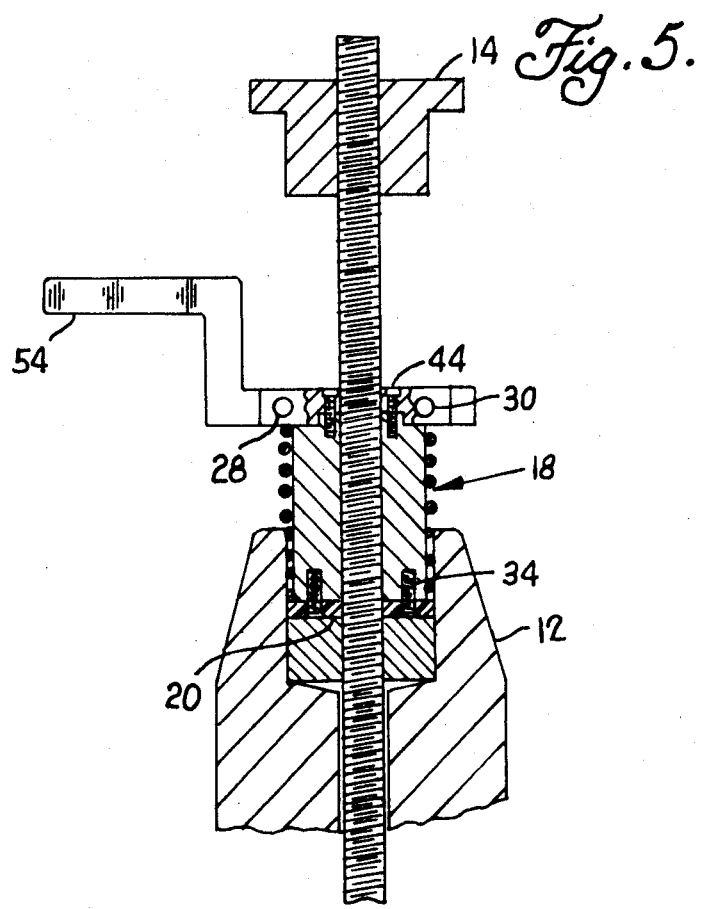

PACKING PULVERIZER

SUMMARY OF THE INVENTION

Valves of one type or another and other types of equipment are conventionally provided with cup-shaped packing glands in which a valve shaft or other type of shaft is positioned for rotary or reciprocating movement. The packing in the packing gland conventionally provides for lubrication and sealing to prevent fluid loss in the valve. Such packing is of conventional nature and commonly deteriorates and hardens over a period of time and the packing must be replaced.

In various types of industrial gate valves used in the process, petroleum, utilities and other types of heavy industry such valves are quite large and expensive. Further, the valves are exposed to the atmosphere, industrial pollution and the like and the packing to be removed presents a problem for the efficiency and prompt and inexpensive removal. Such packing is particularly difficult to remove in gate valves having a yoke through which the valve stem passes and where in the packing gland is positioned inside the yoke and is difficult to disassemble.

By means of this invention there has been provided a packing pulverizer which can be employed in various types of gate valves and particularly those in which the packing gland is confined within a yoke making the end of valve stem not accessible. The packing pulverizer of this invention is particularly adapted for use in such cup-shaped packing glands accommodating the old packing and removing it through flute means on the side of the pulverizer device. The device may be operated manually or through appropriate gearing by an external prime moving source.

Essentially the packing pulverizer of this invention is comprised of a semi-cylindrical housing which is adapted to be opened and fitted around a valve stem through a central opening provided in the housing. The housing is opened in the manner of a jaw and closed and fastened together when fitted around the valve stem. The bottom of the housing is provided with cutting elements or comminuting elements which comminute or cut up the old packing when the device is rotated. Spiral flute means on the exterior of the housing are designed to remove the comminuted debris from the packing gland to the outside.

The housing is adapted to be rotated by means of a handle at the top which provides for manual operation of the device. The device may also be fitted with a gear train comprised of a pair of semi-circular ring gears fitted around the valve stem and connecting with the housing. The gear train means is also provided with a bevel gear for rotating the ring gear by connection to an external power source. Thus, the device may be operated either manually or mechanically as desired.

The pulverizing device of this invention is adapted to be simply used in the field by workmen removing packing and providing maintenance on valves of one type or another. The device is simply employed and provides for efficient and rapid removal of the difficult to break-up packing and such maintenance is simply effected as desired.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for the purpose of illustration only and that the invention is not limited thereto.

IN THE DRAWINGS

FIG. 4, is a top plan view similar to FIG. 2, but showing a modification with the use of a handle rather than the gear train of FIG. 2.

FIG. 5, is a view in vertical axial section of the embodiment of FIG. 4.

DESCRIPTION OF THE INVENTION

Figure 1:
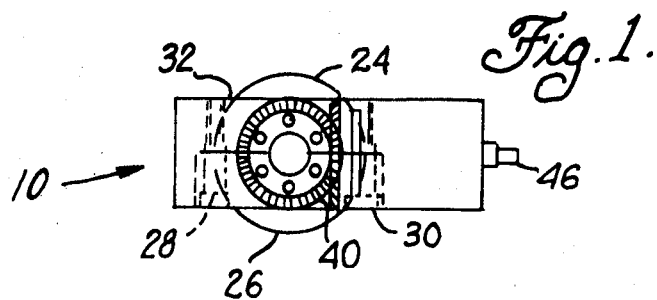
FIG. 1, is a top plan view of the pulverizing device.
Figure 2:
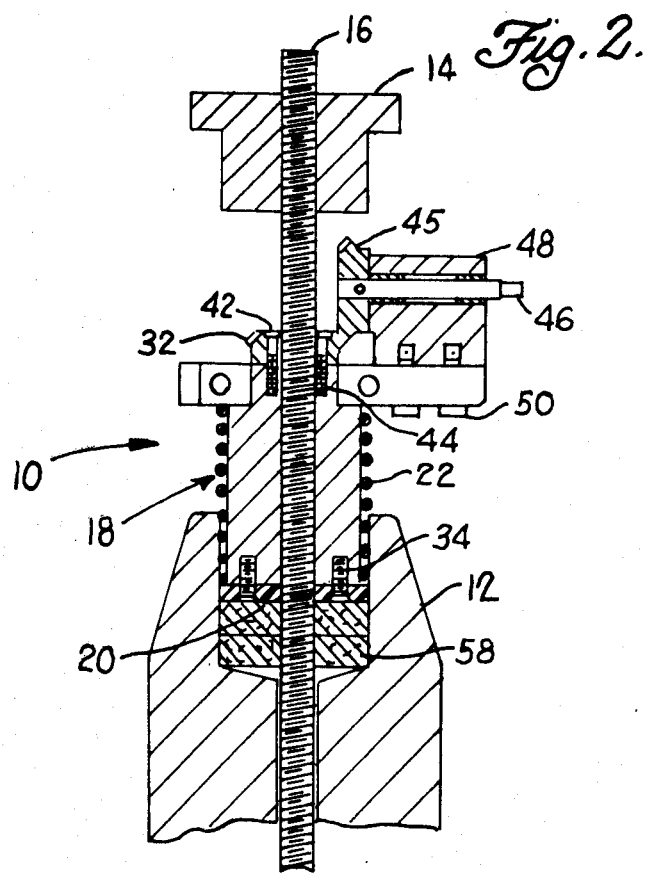
FIG. 2, is a view in axial section through a packing gland and the pulverizer device of this invention.
Figure 3:
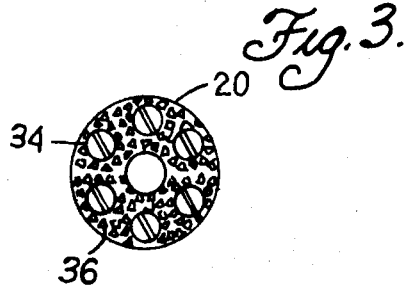
FIG. 3, is a bottom plan view of the pulverizing device.

The pulverizing device of this invention is generally indicated by the reference numeral 10 in FIGS. 1 and 2. As there shown, it is employed, as particularly shown in FIG. 2, in a cup-shaped packing gland 12 in which the compression flange 14 has been removed. A valve stem 16 is shown passing through the gland.

The pulverizer device is generally comprised of a cylindrical housing 18 having a bottom comminuting member 20 and flute means 22 at the side of the housing.

The housing is comprised of two semi-cylindrical members 24 and 26 which are adapted to be held together by bolt members 28 and 30 fitting through a top bearing member 32. The bearing member is constructed of two half portions held together by these bolts.

The housing is provided with a pair of semicircular comminuting plates connected by bolts 34 at the bottom of the housing. The comminuting plates are provided with comminuting elements 36 which cut up the packing as the housing is rotating.

In order to provide for powered rotational movement, a pair of semi-circular ring gear elements 38 and 40 are connected by bolts 42 and 44 to the housing. A bevel gear 45 meshes with the ring gear and is connected to a shaft 46 which receives a power cable adapted to be connected to an external power source to provide powered rotary movement. A bearing block 48 supports the bevel gear 45 and the power shaft 46. The bolts 50 connect the support block to the bearing 32 at the top of the cylindrical housing.

In the modification of FIGS. 4 and 5, the power source is replaced by the manual handle 54. This handle is formed as an extension of the support bearing 32 at the top of the housing and may be used for manual rotation of the housing where an external power source is not available or is not desired.

Use

The packing pulverizer device of this invention is very simply used in the field. For removal of old packing 58 as shown in FIG. 2, the compression flange 14 is first conventionally disassembled from the packing gland and moved upwardly on the valve stem 16. When this has been effected, the two half members 24 and 26 of the cylindrical housing are then fitted around the valve stem and connected together. The device is then ready for use either by powered operation through the gear train of FIGS. 1 and 2 or through the manual handle 54.

Where the manual handle 54 is desired to be employed, manual rotational movement is simply effected and the comminuting elements 36 break-up or comminute the old packing. The packing is removed through the flute means 22 out of the cup-shaped housing. The close relationship of the exterior of the housing with the internal diameter of the cup-shaped packing gland provides a restricted path and efficiently effects the removal of the old cut-up or pulverized material. When the comminuted material has been completely broken up and removed, the pulverizing device is withdrawn from the cup-shaped opening in the packing gland and simply disassembled and removed. New packing is then installed in a conventional fashion.

Where the power gear train is desired to be removed of FIGS. 1 and 2, the split ring gear members 38 and 40 are utilized. The meshing of the bevel gear 45 within the ring gear and powering by the power shaft 46 from the external power source effectively causes the ring gear to rotate the connected housing. The rotational movement of the housing provides comminutation through the cutter elements 36 in the same fashion but at a faster and more powerful rate than the manual means but removal of the comminuted material is otherwise identical.

Accordingly, there has been provided by this invention a very simply devised packing pulverizer device. This device may be simply employed inside a valve yoke where the ends of the valve stem are not accessible for use of the device. The device is provided for both manual and powered rotation and can be used with packing glands of various configurations. It will be understood that although the packing pulverizing device is disclosed in semi-circular portions, it can be used in multiple segments adapted to be connected together or can even be made integral in valves where it can be fitted over the end of the valve stem and made accessible to the packing gland.

Various changes and modifications may be made within this invention as will be readily apparent to those skilled in the art. Such changes and modifications are within the scope and teaching of this invention as defined by the claims appended hereto.

What is claimed is:

1. A packing pulverizer device for removing packing from cup-shaped packing glands having an axial valve stem, said device comprising a cylindrical housing having a central opening for fitting around said valve stem, said housing having a bottom provided with packing comminuting means, flight means on side walls of said housing for carrying comminuting packing from said packing gland and means for rotating said housing, said housing being comprised of a plurality of members adapted to be removably fitted around said valve stem.

2. The packing pulverizer device of claim 1, in which said housing is comprised of a pair of hemi-cylindrical members having a central hemi-cylindrical opening and means are provided to fasten said members together about said valve stem with said stem closely fitting through a cylindrical opening formed when said members are fitted together.

3. The packing pulverizer of claim 1 in which the housing has a transversely extending bottom wall provided with comminuting elements comprising said comminuting means, said housing is provided with a support member having bearing means supporting said housing for rotary movement with respect to said valve stem, gear means connecting said housing through said bearing means to a source of power for rotating said housing, said support member has a central opening receiving said valve stem and said gear means is a ring gear having central opening receiving said valve stem and said support member supports a prime moving gear element driven by said source of power at one side of the valve stem engageable with said ring gear and said support member and said ring gear are comprised of a multiplicity of sections adapted to be fitted around said valve stem and connected together.

4. The packing pulverizer device of claim 3, in said ring gear is positioned co-axially with the valve and the prime moving gear is positioned with its axis perpendicular to the valve stem and meshes with the ring gear in a bevel gear relationship.

5. The packing pulverizer device of claim 1, in which the housing has a transversely extending bottom wall provided with comminuting elements comprising said comminuting means, said housing has side walls provided with spiral flute elements comprising said flight means and said housing is comprised of a plurality of members adapted to be removably fitted around said valve stem.

6. The packing pulverizer device of claim 1, in which said housing is provided with a support member having bearing means supporting said housing for rotary movement with respect to said valve stem, gear means connecting said housing through said bearing means to a source of power for rotating said housing and in which said support member and said ring gear are comprised of a multiplicity of sections adapted to be fitted around said valve stem and connected together.

* * * * *